Figure 1A:
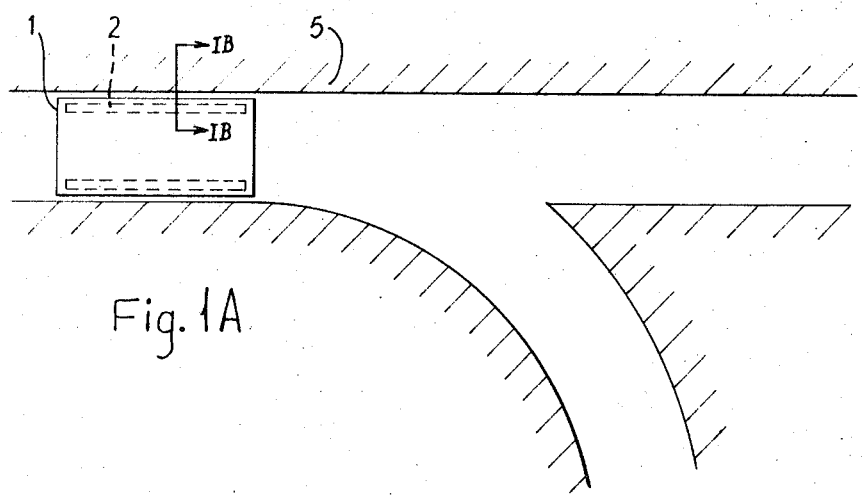

United States Patent [19]

Steenbeck et al.

[11] 3,828,686
[45] Aug. 13, 1974

[54] MAGNETIC GUIDE FOR A RAILWAY VEHICLE

[75] Inventors: Ulf Steenbeck, Miesbach; Hans Weidinger, Ottobrunn, both of Germany

[73] Assignee: Messerschmitt Bolkow-Blohm GmbH, Munchen, Germany

[22] Filed: Aug. 3, 1972

[21] Appl. No.: 277,782

[30] Foreign Application Priority Data
Aug. 10, 1971  Germany.......................... 2140103

[52] U.S. Cl..... 104/148 MS, 104/130, 104/148 LM
[51] Int. Cl................................................ B60l 9/18
[58] Field of Search....... 104/148 LM, 148 MS, 130

[56] References Cited
UNITED STATES PATENTS

| | | | |
|---|---|---|---|
| 3,233,559 | 2/1966 | Smith et al............... | 104/148 LM X |
| 3,555,380 | 1/1971 | Hings....................... | 104/148 LM X |
| 3,696,753 | 10/1972 | Ross et al. .................. | 104/148 LM |

*Primary Examiner*—M. Henson Wood, Jr.
*Assistant Examiner*—George H. Libman
*Attorney, Agent, or Firm*—Woodhams, Blanchard and Flynn

[57] ABSTRACT

Lateral guide means for a magnetically supported and track controlled vehicle. In a magnetically supported vehicle lateral guide means are provided for guiding same both along a straight or slightly curving portion of a track and for guiding same through a switch. One set of magnets is provided along one side of the vehicle and another set of magnets is provided along a guide rail adjacent the track. In one embodiment, either of said sets of magnets is a set of electromagnets and the other is a set of permanent magnets while in another embodiment all magnets are electromagnets. A similar arrangement is provided on the opposite side of the vehicle. By creating repelling forces between some of said magnets and attracting forces between others thereof, an accurately controllable lateral guide is developed for said vehicle by which same is caused to maintain an accurately controllable spacing between the vehicle and the side guiding means. A further modification includes combinations of linear motors on either side of the vehicle together with guiding magnets between the vehicle and a laterally positioned track.

9 Claims, 8 Drawing Figures

MAGNETIC GUIDE FOR A RAILWAY VEHICLE

In vehicles which are held freely floating by electromagnets with respect to a rail arrangement, lateral guiding is always required to maintain a stable equilibrium position against the influence of aerodynamic and centrifugal forces or the like. This is particularly true for vehicles which are held in a floating position by magnetic attracting forces. Advantageously the guiding of these vehicles in lateral direction is accomplished also without contact therewith along magnetically conductive rails by further electromagnets arranged on both sides of the vehicles.

Such guide means has the advantage that, circumstances permitting, no movable switch parts are needed for the switches. To turn in a desired direction, it is only necessary to discontinue the energization of all electromagnets on one side of the vehicle. Thus, if, for example, in a switch only the electromagnets on the right side of the vehicle are in operation, then all vehicles will turn automatically to the right.

The guiding of the vehicles in a switch zone with electromagnets on only one side of the vehicle for a certain distance along the rail associated with them is, however, only possible if an opposing force acts against the magnetic attraction between these electromagnets and the rail. The centrifugal force of the vehicles can be used as counterforce but only in the case of substantial changes in the direction of travel. Where the direction of travel is to be maintained or only slightly changed, then the counterforce must be artificially produced.

In one known suspended railway (German Pat. No. 707 032) wherein the vehicles are held freely floating by lifting powers of electromagnets on iron rails which are arranged above the vehicles and along which the vehicles are guided, the above-mentioned counterforce is obtained through support magnets in connection with a support rail which in the switch zone is tapered along one side. Through the tapering of the support rail the vehicles in driving straight ahead have a tendency to move away from the respective guide rail which in turn is prevented by the electromagnets (the guide magnets) cooperating with said rail.

This solution is applicable only for vehicles with support magnets and then practically only for the special arrangement so described. Aside from this, there is danger, particularly under the effect of suddenly occurring strong aerodynamic forces, that the support magnets which are opposite the tapered zone of the support rail will detach from it. This can then result in a considerable interference with the support system and thus also with the guide.

The purpose of the invention is to provide a magnetic guide for a rail-mounted track in which vehicles are guided along magnetically conductive rails by electromagnets arranged on both sides, the aforementioned counterforce can be produced in the switch zone independently from the support magnets and both during straight-ahead travel of the vehicles and also during traveling around curves.

To attain this objective, the invention contemplates that in the switch zone both attracting and repelling magnetic forces effect the desired guidance, by causing electromagnets on the right or the left sides of a vehicle to attract or repel alternately stationary positioned magnets. In this manner either the polarity of the electromagnets of the vehicle can be changed alternately with respect to stationary permanent magnets of similar polarity, or in the case that the stationary magnets are electromagnets, then their polarity can be changed as needed.

In place of continuously changing the polarity of electromagnets it is also possible to either arrange on each vehicle side at least one row of electromagnets with alternately different polarity or to provide stationary magnets of alternately different polarity; the latter can then again be constructed as permanent magnets.

Accordingly in such a magnetic guide of the vehicles, a counterforce on the right or the left vehicle sides is effected in the switch zone exclusively by means (magnets) which are associated directly with the guide. Such guide is thus as a practical matter suitable for all land vehicles having a predetermined track or path. Thus not only magnetically supported vehicles are here considered but also air cushion vehicles or vehicles with sets of wheels which have only a supporting function.

If the electromagnets of the vehicles always have the same polarity, it can also be provided that in the switch zone the electromagnets of the right or the left vehicle sides and stationary magnets apply repelling forces onto one another and simultaneously further stationary magnets attract magnetically conductive rails of the respective vehicle sides. The stationary magnets which are associated with each vehicle side are advantageously arranged in two horizontal planes.

The requirement above mentioned can be met accordingly in a different manner, but one which lies within the scope of the invention, by arranging the electromagnets of each vehicle side on both sides of a carrier and in the switch zone the carrier of the left or the right vehicle side is guided between two parallel and magnetically conductive rails.

Finally, where conventional linear motors are used which consist of at least two armatures arranged on both sides on the vehicle in horizontal position and stationary stators, the magnets which would otherwise be stationarily arranged additionally in the switch zone may be omitted by reducing the width of the stators in the switch zone. In this construction a counterforce is produced by the linear motor when one of its armatures is not in operation. Thus, if for example a vehicle is to turn to the left in the switch zone, then the electromagnets and the armature of the right vehicle side are made inoperative. The operating armature of the left vehicle side then receives without the presence of the electromagnets of this vehicle side a lateral movement on shifting opposite its stator (because of its reduced width) in the direction of the stator of the right vehicle side. This is prevented by the electromagnets of the left vehicle side. At a suitable regulation of the excitation of these electromagnets, a certain nominal distance to the guide rail associated with them can be maintained within close limits.

The invention will be discussed more in detail hereinafter in connection with exemplary embodiments schematically illustrated in the drawing, in which:

FIG. 1A is a top view of an arrangement for the magnetic guiding of a vehicle in a switch.

Figure 7:
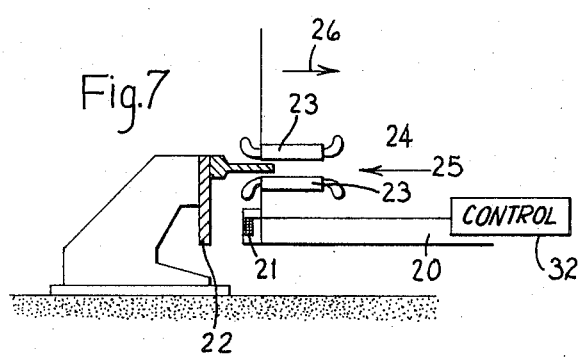
Figure 1B:
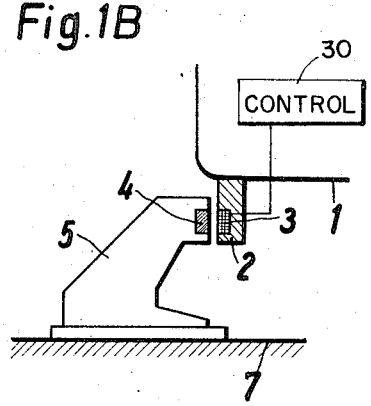
Figure 2:
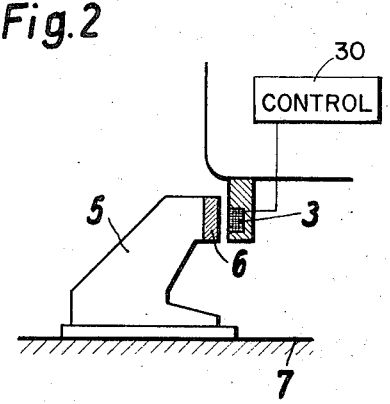
Figure 3:
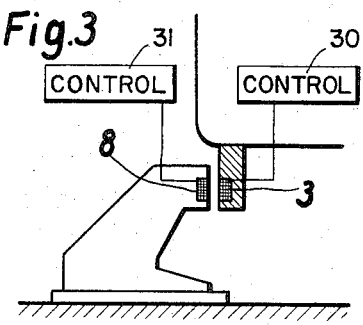
Figure 4:
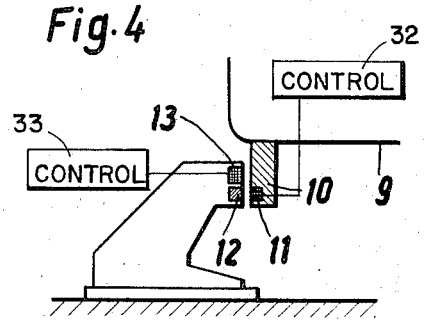
Figure 5:
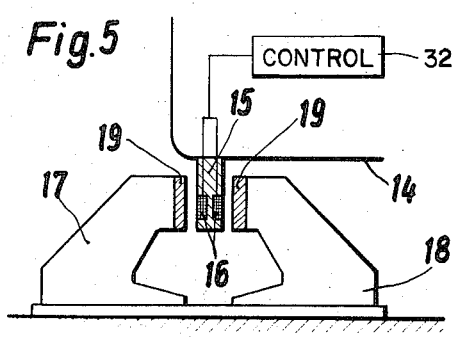
Figure 6:
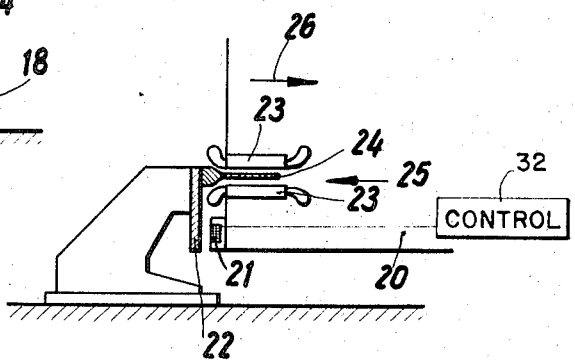

FIG. 1B is a cross-sectional view of an arrangement for the magnetic guiding of a vehicle in a switch taken along the line IB—IB of FIG. 1A, FIG. 2 illustrates the arrangement according to FIG. 1 outside of a switch, FIG. 3 illustrates the arrangement according to FIG. 1 with stationary electromagnets in place of permanent magnets, FIGS. 4 and 5 are cross-sectional views of further arrangements for guiding a vehicle in a switch, and FIG. 6 is a cross-sectional view of an arrangement for guiding in a switch a vehicle driven by a linear motor; and FIG. 7 illustrates the narrow stator construction.

In the arrangement according to FIG. 1, a support member 2 for a row of electromagnets 3 is secured on the bottom 1 of a vehicle not illustrated in detail but which can for example be carried by sets of wheels. Said electromagnets are if necessary distributed over the length of the vehicle and each has the same nominal distance to a row of stationary permanent magnets 4 which are secured on a rail carrier 5. The permanent magnets 4 are provided only in the zone of a switch (not illustrated). Outside of the switch (FIG. 2), the rail carrier 5 carries a rail 6 which is magnetically conductive and which serves the electromagnets 3 as an armature.

The right side (not illustrated) of the vehicle has a similar arrangement in mirror-image construction associated therewith.

The guiding of the vehicle outside of a switch is accomplished by using the magnetic attraction between its electromagnets 3 and the rails 6 on both sides of its track 7. In the zone of a switch this is not possible and instead only the electromagnets 3 of either the right (not illustrated) or only the ones of the left side of the vehicle can be used. Since in traveling straight ahead or in making small changes in the direction of travel, it cannot be assured that the vehicle will be maintained at a predetermined distance from the rail 6 (at either the right or left side of the vehicle) as it travels along said rail, the rails 6 are in a switch zone replaced by the stationary permanent magnets 4 (FIG. 1). Further usual means 30 are provided to control and change alternately the polarity of the electromagnets 3. Thus, the guiding of the vehicle in the switch zone is accomplished depending on the desired direction of travel by changing alternately the polarity of the electromagnets 3 of the right or of the left vehicle side and thereby attracting and repelling alternately the permanent magnets 4 at the respective sides of the vehicle. In this manner a stable side guiding of the vehicle is obtained. The energization of the electromagnets can be controlled in any conventional manner.

For the same purpose it is also possible to provide stationary electromagnets, wherein changes in their polarity is used for guiding purposes in place of the changing polarity of the electromagnets 3 on the vehicle. In this case thus the permanent magnets 4 of FIG. 1 are replaced by a row of electromagnets 8 as illustrated in FIG. 3. In this arrangement a changing of the polarity of either the electromagnets 3 or 8 can be entirely cancelled if the adjacently positioned group of electromagnets 3 of the vehicle or the stationary ones 8 have alternately different polarity. If this is the case, the example, for the electromagnets 3 of the vehicle, one of two successive ones will always attract and the other one will always repel the several stationary electromagnets 8 each having the same polarity. It is understood that in the arrangement illustrated in FIG. 3, the excitation of the electromagnets 3 of the vehicle or the one of the stationary electromagnets 8 can be regulated by controls 30 and 31 in order to thus exactly maintain a nominal distance.

In the arrangement according to FIG. 4 a carrier 10 for a series of electromagnets 11 is secured on the bottom 9 of a vehicle floor, which electromagnets repel a series of stationary permanent magnets 12 wherein all thereof have the same polarity, while a series of electromagnets 13 arranged above these attract the carrier. In this manner also a stable guide of the respective vehicle along the stationary magnets (12 and 13) is assured. In place of the stationary electromagnets 13, it is also possible to provide a magnetically conductive rail which has associated therewith a further series of electromagnets on the carrier if these latter do not impose an excessive weight onto the vehicle under the particular circumstances in question.

It is understood that this arrangement is also provided in mirror image on the right side of the vehicle and corresponding to the desired direction of travel only the electromagnets associated with the right or the left vehicle side are in operation and their excitation is controlled in the usual manner by controls 32 and 33. This is also true for the arrangements described hereinafter.

According to FIG. 5 a carrier is suspended from the bottom 14 of the vehicle and is provided on both sides with a row of electromagnets 16. The illustration chosen for the switch zone shows that the carrier 15 extends between two rails 19 which are parallel to one another and are secured on rail carriers 17 and 18. Both rows of electromagnets 16 are simultaneous in attracting relationship to the respectively opposite one of the rails 19 so that the carrier 15 is held in a central position between both rails 19. The excitation of all electromagnets 16 can be regulated or if preferred only the electromagnets of one row. This arrangement can also be altered by placing the vehicle electromagnets, which in FIG. 5 face the rail carrier 18, onto the rail carrier 18 in place of the rail 19 so that in such case the electromagnets act onto the carrier itself. In order to operate the apparatus without movable switch parts (particularly rail carriers 18), the carriers 15 (of both sides of the vehicle) can be constructed in such a manner that they can be swung or retracted into the vehicle and thus in a switch zone the carrier and the electromagnets which are not in operation are always inside of the vehicle.

As a further modification of the above-described arrangements, the embodiment according to FIG. 6 provides that the guiding of a vehicle 20 (which is only partly illustrated in the switch zone) is not confined exclusively to means which are designated only for guiding. Rather, in addition to the series of electromagnets 21 which cooperate with a stationary magnetically conductive rail 22, a conventional linear motor provided for drive purposes has also a guiding function. Said linear motor drive consists of an armature 23 which is arranged on the vehicle in a horizontal position and which consists of two laminated cores with operating windings inserted therein and consists further of a stationary stator 24 which is guided between the cores. To fulfill the guiding function of the linear motor, the width of its stator 24 is such that it only partially fills in lateral direction the air gap 25 formed between the armatures 23. There is also a drive which is associated in mirror image construction with the other (not illustrated) vehicle side. If this drive and the electromagnets of the right vehicle side are inoperative, then the drive of the left vehicle side (FIG. 6) produces a force which acts against the attraction between the electromagnets 21 and the associated rail 22 of this vehicle side. Its armature 23 would move in the direction indicated by the arrow 26 transversely to the stator 24, if the electromagnets 21 of the same vehicle side are developing insufficient force to oppose such movement. Thus by suitable regulation of the excitation of these electromagnets 21, the desired distance to the rail 22 can be maintained accurately.

In addition it is noted that for such a guide, linear motors with only one core for each vehicle side can also be used. Of these, only one is in operation at any given time depending upon the desired direction of travel. With this form of stable guide, the driving of the vehicle at only one side has practically no effect on the ability of the guide to hold the direction of travel of the vehicle 20 in the switch zone.

The embodiments of the invention in which exclusive property or privilege is claimed are defined as follows:

1. In a magnetic guide for a magnetic suspended railway in which vehicles are guided along and between stationary magnetically conductive rail means by means defining guide electromagnets arranged on opposite sides of each of said vehicles and, in a switch zone, a track change by said vehicle being accomplished through the effect of said guide electromagnet means being energized on only one vehicle side, comprising the improvement wherein said guide electromagnet means in said switching zone on said one side of said vehicle includes control means for effecting a generation of both attracting and repelling forces on said magnetically conductive rail means to effect a balanced lateral guiding of said vehicle along said magnetically conductive rail means on said one side of said vehicle.

2. A magnetic guide according to claim 1, wherein said guide electromagnet means is mounted on said opposite sides of said vehicles and movable therewith; and wherein said magnetically conductive rail means includes permanent magnets mounted thereon.

3. A magnetic guide according to claim 1, wherein said guide electromagnet means is mounted on said opposite sides of said vehicles and movable therewith; and wherein said magnetically conductive rail means includes permanent magnets mounted thereon; and wherein said magnetically conductive rail means includes electromagnet means mounted thereon and second control means for controlling the magnetic field generated thereby.

4. A magnetic guide according to claim 3, wherein at least one of said first mentioned and said second mentioned control means generates an alternating polarity while the other of said first mentioned and said second mentioned control means generates a steady and unchanging polarity.

5. A magnetic guide according to claim 2, wherein said guide electromagnet means comprises a row of electromagnets, said control means effecting a generation of said alternating polarity.

6. A magnetic guide according to claim 2, wherein said magnetically conductive rail means includes a row of permanent magnets having alternatingly different polarity.

7. A magnetic guide according to claim 2, wherein said magnetically conductive rail means further includes electromagnet means mounted thereon and adapted to attract said one side of said vehicle, said permanent magnets being adapted to simultaneously repel said one side of said vehicle.

8. A magnetic guide according to claim 1, including conventional linear motor means for propelling said vehicle along said magnetically conductive rail means and consist of at least two armatures arranged on opposite sides of said vehicle both lying in a horizontal plane and stationary stators secured to said magnetically conductive rail means, said stators having a reduced width in the switch zone.

9. A magnetic guide according to claim 1, including conventional linear motor means for propelling said vehicle along said magnetically conductive rail means and consist of at least two armatures arranged on opposite sides of said vehicle both lying in a horizontal plane and stationary stators secured to said magnetically conductive rail means, said stators having a reduced width in the switch zone.

* * * * *